United States Patent
Bai et al.

(10) Patent No.: US 11,904,472 B2
(45) Date of Patent: Feb. 20, 2024

(54) HUMANOID ROBOT CONTROL METHOD, HUMANOID ROBOT USING THE SAME, AND COMPUTER READABLE STORAGE MEDIUM

(71) Applicant: UBTECH ROBOTICS CORP LTD, Shenzhen (CN)

(72) Inventors: Jie Bai, Shenzhen (CN); Ligang Ge, Shenzhen (CN); Yizhang Liu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 177 days.

(21) Appl. No.: 17/504,544

(22) Filed: Oct. 19, 2021

(65) Prior Publication Data
US 2022/0203526 A1 Jun. 30, 2022

Related U.S. Application Data

(63) Continuation of application No. PCT/CN2020/141705, filed on Dec. 30, 2020.

(51) Int. Cl.
*B25J 9/16* (2006.01)
*B25J 13/08* (2006.01)

(52) U.S. Cl.
CPC .......... *B25J 9/1646* (2013.01); *B25J 9/1651* (2013.01); *B25J 9/1653* (2013.01); *B25J 9/1664* (2013.01); *B25J 13/088* (2013.01)

(58) Field of Classification Search
CPC ...... B25J 9/1646; B25J 9/1651; B25J 9/1653; B25J 9/1664; B25J 13/088; B62D 57/032
See application file for complete search history.

(56) References Cited

U.S. PATENT DOCUMENTS

| | | |
|---|---|---|
| 2010/0250001 A1 | 9/2010 | Hodgins et al. |
| 2011/0178637 A1 | 7/2011 | Lee et al. |
| (Continued) | | |

FOREIGN PATENT DOCUMENTS

| | | |
|---|---|---|
| CN | 103750841 A | 4/2014 |
| CN | 111176283 A | 5/2020 |
| CN | 111360827 A | 7/2020 |

OTHER PUBLICATIONS

Roetenberg, Daniel, Henk Luinge, and Per Slycke. "Xsens MVN: Full 6DOF human motion tracking using miniature inertial sensors." Xsens Motion Technologies BV, Tech. Rep 1 (2009): 1-7. (Year: 2009).*

(Continued)

*Primary Examiner* — Adam R Mott
*Assistant Examiner* — Matthew C Gammon

(57) ABSTRACT

A humanoid robot control method, a mobile machine using the same, and a computer readable storage medium are provided. The method includes: mapping posture information of leg joints of a human body to leg joint servos of a humanoid robot to obtain an expected rotation angle and an expected rotation angular velocity of non-target optimized joint servos of the leg joint servos and an expected rotation angle and an expected rotation angular velocity of target optimized joint servos of the leg joint servos; obtaining an optimization objective function corresponding to the target optimized joint servos of the leg joint servos; optimizing the expected rotation angle and the expected rotation angular velocity of the target optimized joint servos to obtain a corrected expected rotation angle and a corrected expected rotation angular velocity of the target optimized joint servos; and controlling each of the leg joint servos of the humanoid robot.

17 Claims, 9 Drawing Sheets

(56) References Cited

U.S. PATENT DOCUMENTS

2013/0218345 A1\* 8/2013 Lee ................... B25J 9/162
                                                                     700/261
2016/0243699 A1\* 8/2016 Kim ................... B25J 9/1605

OTHER PUBLICATIONS

ISR for PCT/CN2020/141705.
Written opinions of ISA for PCT/CN2020/141705.

\* cited by examiner

HUMANOID ROBOT CONTROL METHOD, HUMANOID ROBOT USING THE SAME, AND COMPUTER READABLE STORAGE MEDIUM

CROSS REFERENCE TO RELATED APPLICATIONS

The present application is a continuation-application of International Application PCT/CN2020/141705, with an international filing date of Dec. 30, 2020, the contents of all of which are hereby incorporated by reference.

BACKGROUND

1. Technical Field

The present disclosure relates to humanoid robot technology, and particularly to a humanoid robot control method, a humanoid robot using the same, and a computer readable storage medium.

2. Description of Related Art

The biped humanoid robot is a kind of robot that is capable of imitating the movement of human beings such as standing, walking and jumping. In the existing humanoid robots, the position and posture (i.e., the pose) of the humanoid robot are usually used for programming, and the gait planning algorithm is designed using the precise dynamic model so as to obtain the expected rotation angle of each joint, and then the robot is controlled by autonomous motion and remote control to realize the movement imitation of the humanoid robot. However, since the structure of the robot is relatively complicated, the humanoid robot using a fixed programming method usually has low adaptability to complex terrains, which results in low flexibility and low stability of the humanoid robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be noted that, the embodiments described herein are only for explaining the present disclosure, and are not used to limit thereto.

Figure 1:
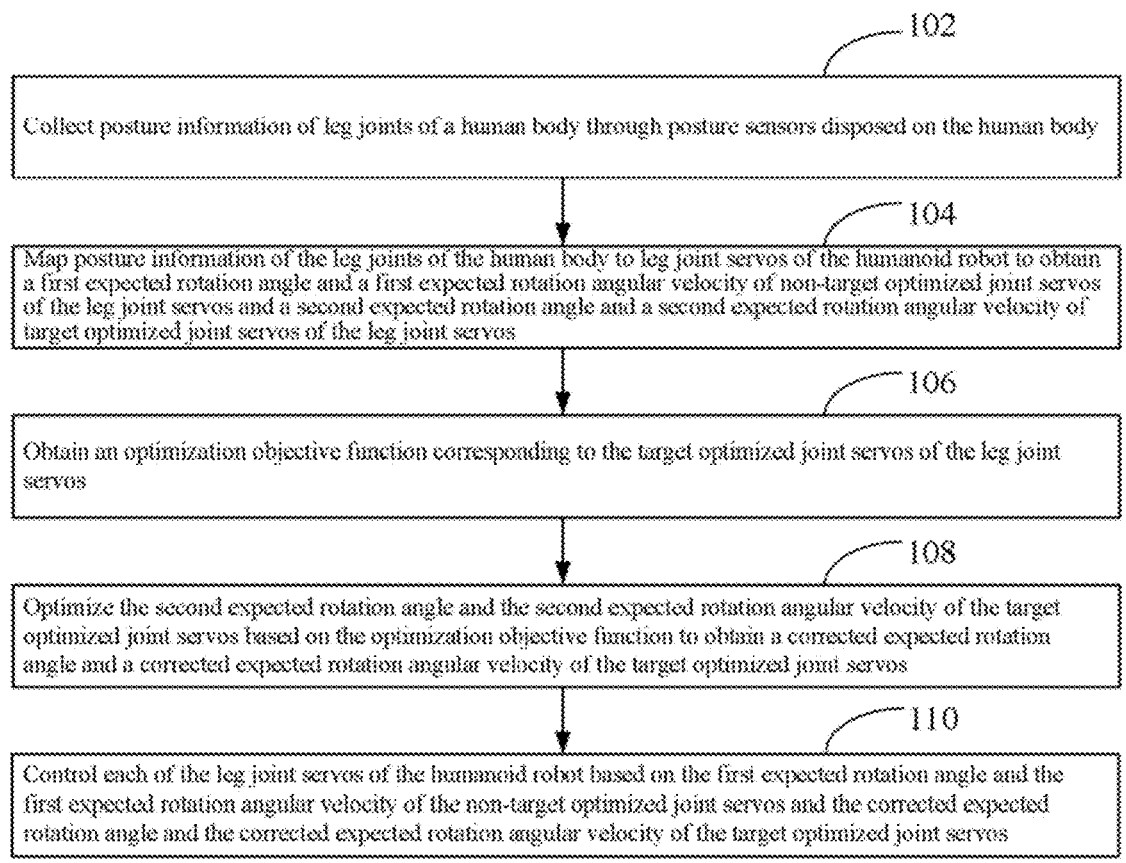
FIG. 1 is a flow chart of an embodiment of a humanoid robot control method according to the present disclosure.

FIG. 1 is a flow chart of an embodiment of a humanoid robot control method according to the present disclosure. A humanoid robot control method is provided. In one embodiment, the humanoid robot control method is a computer-implemented method executable for a processor, which may be applied to a humanoid robot (e.g., a biped robot). The humanoid robot has two legs each including links connected by joints. The method may be implemented through a humanoid robot control apparatus shown in FIG. 7 or a humanoid robot shown in FIG. 8. As shown in FIG. 1, the method may include the following steps.

102: collecting posture information of leg joints of a human body through posture sensors disposed on the human body.

In which, a MEMS (microelectromechanical systems) inertial sensor which can capture posture information of a target in real time may be used as the posture sensor. Compared with the imitation of arm motions, the capture and imitation of leg motions that is emphasized here requires not only motion mapping but also gait stability. Therefore, in order for the humanoid robot to achieve the imitation of the motions of the human body, it is necessary to obtain the posture information corresponding to the leg joints of the human body that may include a rotation angle and a rotation angular velocity corresponding to the leg joints of the human, before the imitation.

104: mapping posture information of the leg joints of the human body to leg joint servos of the humanoid robot to obtain a first expected rotation angle and a first expected rotation angular velocity of non-target optimized joint servos of the leg joint servos and a second expected rotation angle and a second expected rotation angular velocity of target optimized joint servos of the leg joint servos.

In which, a controller of the humanoid robot reproduces the motion of the human body by controlling a servo of the leg joint(s) of the humanoid robot. In one embodiment, the leg joint servos of the humanoid robot are divided into the non-target optimized joint servos and the target optimized joint servo. In which, the non-target optimized joint servo of the humanoid robot includes a hip rotational joint servo, a front hip joint servo, a front knee joint servo, and a front ankle joint servo. In one embodiment, the target optimized joint servo includes at least one of a hip side joint servo and an ankle side joint servo.

106: obtaining an optimization objective function corresponding to the target optimized joint servos of the leg joint servos.

In one embodiment, the optimization objective function is created based on a stability theory of an extrapolated centroid XCoM. Considering the stability of the humanoid robot, at least one of the hip side joint servo and the ankle side joint servo is selected to optimize its second expected rotation angle and its second expected rotation angular velocity. In the existing humanoid robot control methods, the stability of ZMP (zero moment point) is used as the criterion to determine the stability of walking. However, the stability theory of the extrapolated centroid XCoM not only considers the influence of the position of the centroid of the humanoid robot on the stability but also considers that of the speed of the centroid on the stability while the ZMP stability theory only considers the influence of the position of the centroid (center of mass) of the humanoid robot on stability, and is more suitable to use as the criterion to determine the stability of the humanoid robot than the ZMP stability theory. Therefore, in this embodiment, the stability theory of the extrapolated centroid XCoM is used as the criterion to determine the stability of walking, and the optimization objective function is created based on the stability theory of the extrapolated centroid XCoM while an optimization algorithm is used to make the extrapolated centroid XCoM to approach the center of a stable support area (boundary of support, BoS), so that the humanoid robot walks more stably.

In which, the stability theory of the extrapolated centroid XCoM is described as that if the extrapolated centroid XCoM is within the BoS, that is, $b=x+v/w \in [u_{min}, u_{max}]$, the robot will maintain its balance. In which, x is the position of the centroid of the humanoid robot, v is the velocity of the centroid of the humanoid robot, and $w=\sqrt{g/l}$ is the natural frequency.

In the three-dimensional (3D) case, the stability theory of the extrapolated centroid XCoM may be extended as equations of:

$$b_x = x + v_x/w \in [u_{xmin}, u_{xmax}]; \text{ and}$$

$$b_y = y + v_y/w \in [u_{ymin}, u_{ymax}]$$

In the above-mentioned equations, the position of the centroid of the humanoid robot is (x, y), and the speed of the centroid of the humanoid robot is $(v_x, v_y)$.

The optimization objective function may be represented as an equation of:

$$\mathcal{J}(\theta_2, \dot{\theta}_2) = \frac{1}{2}\|b-s\|^2;$$

where, $b=(b_x, b_y)$ is the position of the extrapolated centroid XCoM, $s=(s_x, s_y)$ is the center of the BoS. Based on the mapping relationship between the joints of the humanoid robot and the capture of the motion of the human body, positive kinematics of robot can be used to calculate the position of the extrapolated centroid XCoM, which will not be repeated herein. $\theta_2$ and $\dot{\theta}_2$ are the corrected expected rotation angle and the corrected expected rotation angular velocity of the servo of the leg joint of the humanoid robot, respectively.

108: optimizing the second expected rotation angle and the second expected rotation angular velocity of the target optimized joint servos based on the optimization objective function to obtain a corrected expected rotation angle and a corrected expected rotation angular velocity of the target optimized joint servos.

In which, after obtained, the corrected second expected rotation angle and the corrected second expected rotation angular velocity are sent to the controller to replace the original second expected rotation angle and second expected rotation angular velocity of at least one of the hip joint servo and the ankle side servo that are in the controller.

110: controlling each of the leg joint servos of the humanoid robot based on the first expected rotation angle and the first expected rotation angular velocity of the non-target optimized joint servos and the corrected expected rotation angle and the corrected expected rotation angular velocity of the target optimized joint servos.

In the above-mentioned humanoid robot control method, the behaviors of the human body are imitated by collecting the postures of the human body and controlling the humanoid robot in real time. In this embodiment, the optimization objective function is created, the expected rotation angle and the expected rotation angular velocity of the servo of the leg joint are optimized based on the optimization objective function, and the humanoid robot is controlled according to the optimized corrected expected rotation angle and corrected expected rotation angular velocity so as to achieve the imitation of the behaviors. There is no need to rely on the accurate dynamic model for designing the gait planning algorithm to obtain the expected rotation angle of each joint, the planning process is simplified, the flexibility and stability of the robot is improved, and the humanoid robot can be made to achieve more complex movements.

Figure 2:
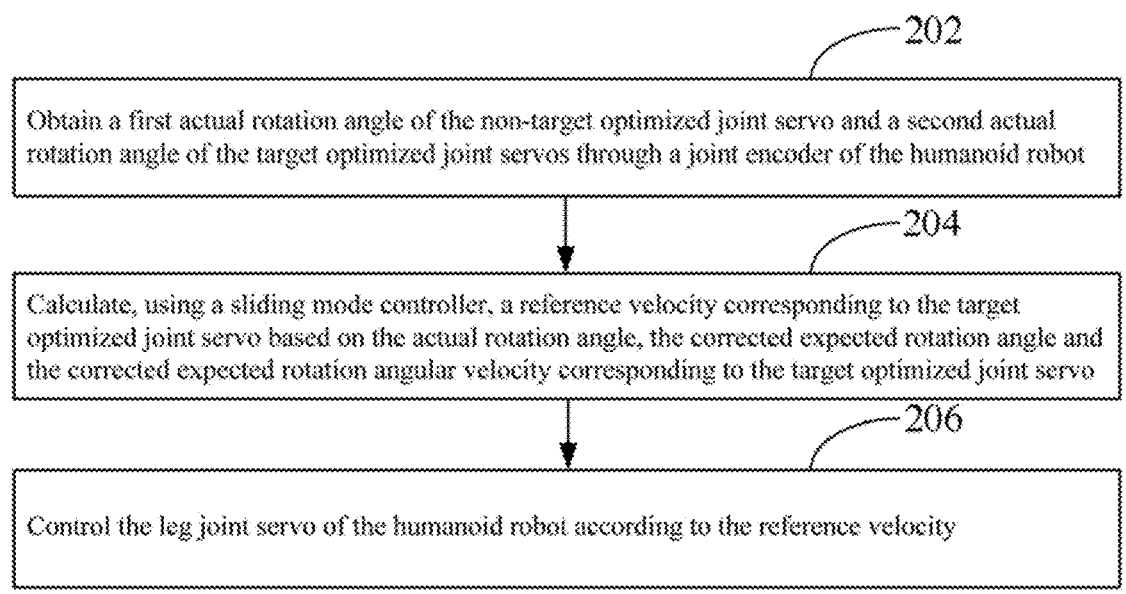
FIG. 2 is a flow chart of an example of controlling leg joint servo in the humanoid robot control method of FIG. 1.

FIG. 2 is a flow chart of an example of controlling leg joint servo in the humanoid robot control method of FIG. 1. As shown in FIG. 2, in one embodiment, the step 110 of controlling each of the leg joint servos of the humanoid robot based on the first expected rotation angle and the first expected rotation angular velocity of the non-target optimized joint servos and the corrected expected rotation angle and the corrected expected rotation angular velocity of the target optimized joint servos may include the following steps.

202: obtaining a first actual rotation angle of the non-target optimized joint servo and a second actual rotation angle of the target optimized joint servos through a joint encoder of the humanoid robot.

In which, the joint encoder may include a position sensor or the like, which may be an angle detection device located on the rotation axis of each joint of the leg of the humanoid robot, and is used to measure the actual angle and actual angular velocity of the servo of each joint of the leg of the humanoid robot.

204: calculating, using a sliding mode controller, a reference velocity corresponding he target optimized joint servo based on the actual rotation angle, the corrected expected rotation angle and the corrected expected rotation angular velocity corresponding to the target optimized joint servo.

In which, the reference velocity is defined as $\dot{\theta}_r = \hat{\theta}_d + k(\theta_d - \theta)$, where $\dot{\theta}_r$ is the reference velocity, $\hat{\theta}_d$ is the corrected expected rotation angular velocity, $\theta_d$ is the corrected expected rotation angle, and $\theta$ is the actual rotation angle. The calculation of the reference velocity is realized using the sliding mode controller. The reference speed corresponding to the target optimized joint servo is obtained by inputting the corrected expected rotation angle and the corrected expected rotation angular velocity obtained through the above-mentioned humanoid robot control method and the actual rotation angle into the sliding mode controller.

206: controlling the leg joint servo of the humanoid robot according to the reference velocity.

In which, the reference velocity $\dot{\theta}_r = \hat{\theta}_d + k(\theta_d - \theta)$ not only includes the expected rotational angular velocity of each leg joint servo of the humanoid robot, but also includes the difference of the actual rotation angles of each leg joint servo of the humanoid robot, that is, the position error. Because of the addition of position error, compared to directly control the leg joint servo of the humanoid robot by controlling the corrected expected rotation angle, controlling the leg joint servo of the humanoid robot by controlling the reference velocity can make the humanoid robot to achieve the imitation of the motion of the human body in a quicker manner, which reduces the lag of the action of the humanoid robot.

Figure 3:
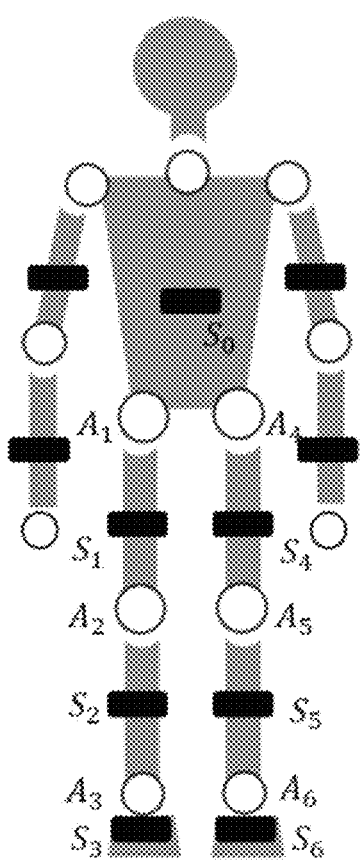
FIG. 3 is a schematic diagram of human body joints and posture sampling nodes according to an embodiment of the present disclosure.
Figure 4:
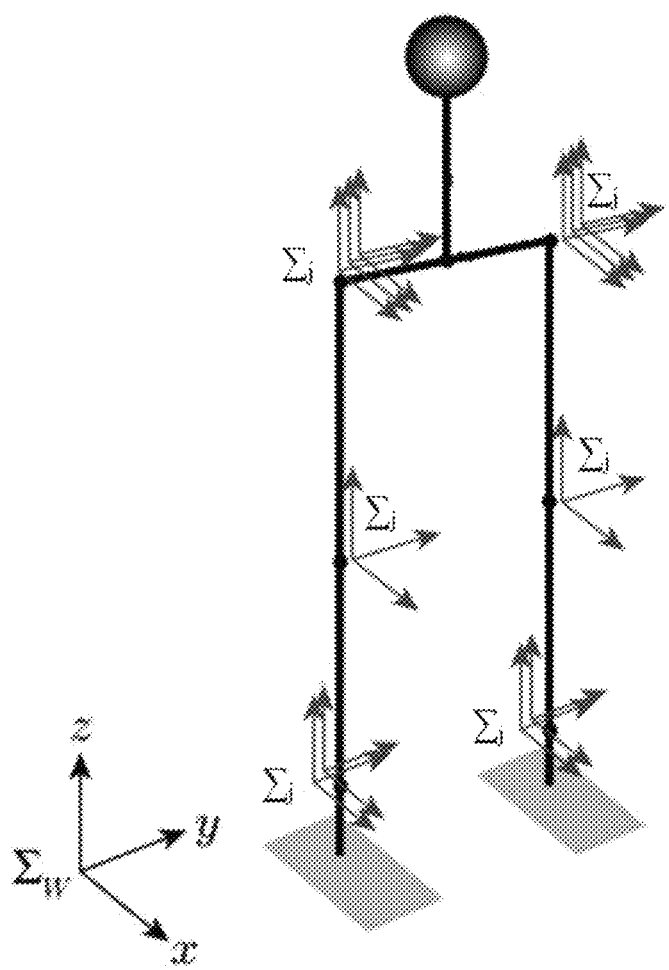
FIG. 4 is a schematic diagram of the degree of freedom model of a human body according to an embodiment of the present disclosure.

FIG. 3 is a schematic diagram of human body joints and posture sampling nodes according to an embodiment of the present disclosure. As shown in FIG. 3, in one embodiment, the leg joints of the human body include six leg sub-joints namely the left hip joint $A_1$, the left knee joint $A_2$, the left ankle joint $A_3$, the right hip joint $A_4$, the right knee joint $A_5$, and the right ankle joint $A_6$. Because the process of the movement of the human body is achieved by the simultaneous action of hundreds to thousands of degrees of freedoms (DOFs) of the joints, in order to apply the angle data of the joints of the human body to the humanoid robot, the DOFs of the human body need to be simplified. FIG. 4 is a schematic diagram of the degree of freedom model of a human body according to an embodiment of the present disclosure. Referring to FIG. 4, the created coordinate systems $\Sigma_j$ of the joints of the legs is shown, and the created world coordinate system $\Sigma_w$ includes: the X axis directing to the front of the human body, the Y axis directing to the left side of the human body, and the Z axis directing to the top of the head of the human body. In which, each leg has six DOFs, and the initial coordinate system is in the same direction as the world coordinate system $\Sigma_w$. Taking the left leg as an example, the hip joint corresponds to $A_1$ of FIG. 3, where the rotation axis of the hip rotational joint is the Z axis, the rotation axis of the hip side joint is the X axis, the rotation axis of and the front hip joint is the Y axis; the joint corresponds to $A_2$ of FIG. 3, where the rotation axis of the front knee joint is the Y axis; and the ankle joint corresponds to $A_3$ of FIG. 3, where the rotation axis of the front ankle joint is the Y axis, and the rotation axis of the ankle side joint is the X axis.

Figure 5:
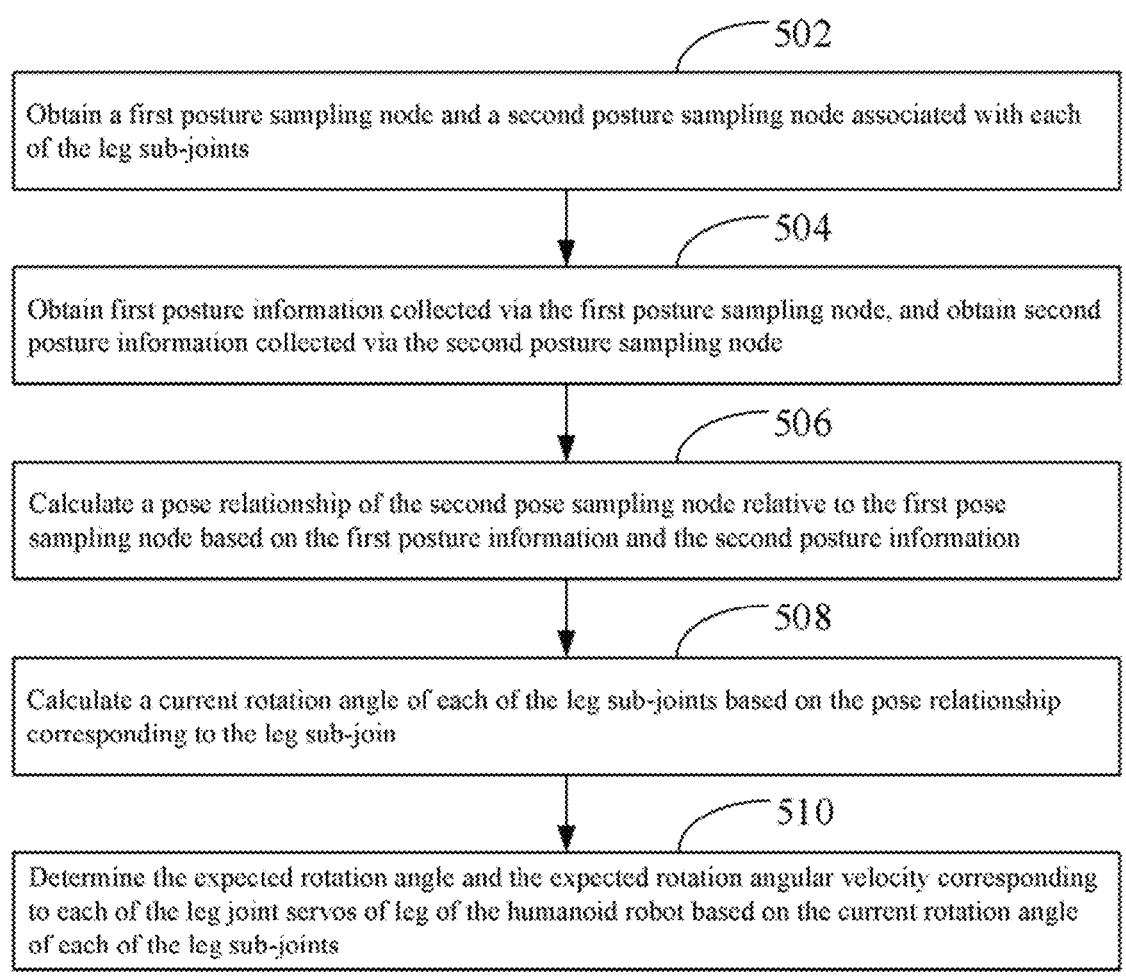
FIG. 5 is a flow chart of an example of mapping posture information in the humanoid robot control method of FIG. 1.

FIG. 5 is a flow chart of an example of mapping posture information in the humanoid robot control method of FIG. 1. As shown in FIG. 5, in one embodiment, the step 104 of mapping the posture information of the leg joints of the human body to leg joint servos of the humanoid robot to obtain the first expected rotation angle and the first expected rotation angular velocity of the non-target optimized joint servos of the leg joint servos and the second expected rotation angle and the second expected rotation angular velocity of the target optimized joint servos of the leg joint servos may include the following steps.

502: obtaining a first posture sampling node and a second posture sampling node associated with each of the leg sub-joints In which, N posture sampling nodes are designed for the human body (N≥11, where N=11 in FIG. 4). Referring to FIG. 3, the posture sampling node $S_0$ is installed on the trunk of the human body; $S_1$, $S_2$ and $S_3$ are installed on the left thigh, the left calf and the left foot, respectively; and $S_4$, $S_5$ and $S_6$ are installed on the right thigh, the right calf and the right foot, respectively.

504: obtaining first posture information collected via the first posture sampling node, and obtaining second posture information collected via the second posture sampling node.

In one embodiment, the first posture information collected by the posture sampling node $S_1$ is obtained, and the second posture information collected by the posture sampling node $S_2$ is obtained.

506: calculating a pose relationship of the second pose sampling node relative to the first pose sampling node based on the first posture information and the second posture information.

508: calculating a current rotation angle of each of the leg sub joints based on the pose relationship corresponding to the leg sub-joint.

In one embodiment, a quaternion-based posture calculation algorithm is used to solve the yaw angle yaw, the pitch angle pitch, and the roll angle roll from the posture quaternion based on the data collected by the MEMS inertial sensor. The quaternion method only needs to solve four elements, the amount of calculation is relatively small, and can achieve the full-angle posture analysis. In which, the quaternion may be expressed as an equation of:

$$Q=q_0+q_1 i+q_2 j+q_3 k \text{ or } Q=(q_0,q_1,q_2,q_3)$$

Given that the quaternion postures collected by the nodes $S_1$ and $S_2$ are $Q_1$ and $Q_2$, respectively, the rotation quaternion of the node $S_2$ relative to the node $S_1$ will be $Q_{12}=Q_1^{-1} \times Q_2$. Assuming that $Q_{12}=q_0+q_1 i+q_2 j+q_3 k$, then the Euler angle of the node $S_2$ relative to the node $S_1$ will be:

$$\begin{cases} \text{roll} = \text{atan2}(2(q_0 q_1 + q_2 q_3), 1 - 2(q_1^2 + q_2^2)) \\ \text{pitch} = \text{asin}(2(q_0 q_2 + q_1 q_3)) \\ \text{yaw} = \text{atan2}(2(q_0 q_3 + q_1 q_2), 1 - 2(q_2^2 + q_3^2)) \end{cases}$$

510: determining the expected rotation angle and the expected rotation angular velocity corresponding to each of the leg joint servos of leg of the humanoid robot based on the current rotation angle of each of the leg sub-joints.

In which, the trunk of the human body model is used as the root node, and the changes of the angle of the human joint $A_1$ in the three-dimensional space which respectively corresponds to the change of the angle of three servos in the robot model are calculated through the pose relationship between the posture sampling node $S_0$ at the trunk and the posture sampling node $S_1$ at the thigh, where the rotation angles are the yaw angle $\theta_1$, the roll angle $\theta_2$, and the pitch angle $\theta_3$ in turn. The changes of the angle of the human joint $A_2$ in the three-dimensional space which correspond to the change of the angle of a servo in the robot model are calculated through the pose relationship between the posture sampling node $S_1$ at the thigh and the posture sampling node $S_2$ at the calf, where the rotation angle is the pitch angle $\theta_4$. The changes of the angle of the human joint $A_3$ in the three-dimensional space which correspond to the changes of the angle of two servos in the robot model is calculated through the pose relationship between the posture sampling node $S_2$ at the calf and the posture sampling node $S_3$ at the foot, where the rotation angles are the pitch angle $\theta_5$ and the roll angle $\theta_6$.

In one embodiment, the determining the expected rotation angle and the expected rotation angular velocity corresponding to each of the leg joint servos of leg of the humanoid robot based on the current rotation angle of each of the leg sub joints includes: determining the expected rotation angle and the expected rotation angular velocity corresponding to a left hip rotational joint servo $L_1$, a left hip front joint servo $L_2$, and a left hip side joint servo $L_5$ in the leg joint servos of the humanoid robot based on the current rotation angle of the left hip joint; determining the expected rotation angle and the expected rotation angular velocity corresponding to a left knee front joint servo $L_3$ in the leg joint servos of the humanoid robot based on the current rotation angle of the left knee joint; determining the expected rotation angle and the expected rotation angular velocity corresponding to a left ankle front joint servo $L_4$ and a left ankle side joint servo $L_6$ in the leg joint servos of the humanoid robot based on the current rotation angle of the left ankle joint; determining the expected rotation angle and the expected rotation angular velocity corresponding to a right hip rotational joint servo $R_1$, a right hip front joint servo $R_2$, and a right hip side joint servo $R_5$ in the leg joint servos of the humanoid robot based on the current rotation angle of the right hip joint; determining the expected rotation angle and the expected rotation angular velocity corresponding to a right knee front joint servo $R_3$ in the leg joint servos of the humanoid robot based on the current rotation angle of the right knee joint; and determining the expected rotation angle and the expected rotation angular velocity corresponding to a right ankle front joint servo $R_4$ and a right ankle side joint servo $R_6$ in the leg joint servos of the humanoid robot based on the current rotation angle of the right ankle joint.

In one embodiment, after the calculating the current rotation angle of each of the leg sub-joints based on the pose relationship corresponding to the leg sub-joint, the method further includes: obtaining an initial rotation angle of each of the leg sub-joints. The determining the expected rotation angle and the expected rotation angular velocity corresponding to each of the leg joint servos of leg of the humanoid robot based on the current rotation angle of each of the leg sub-joints includes: determining the expected rotation angle and the expected rotation angular velocity corresponding to each of the leg joint servos of leg of the humanoid robot based on the initial rotation angle and the current rotation angle of each of the leg sub-joints.

In which, the initial rotation angles corresponding to the sub-joints of the legs of the human body are set through initialization, which are $\theta_{10}$, $\theta_{20}$, $\theta_{30}$, $\theta_{40}$, $\theta_{50}$, and $\theta_{60}$. Therefore, the expected rotation angle $\theta_{id}$ (i=1, 2, 3, ..., 6) corresponding to each sub-joint of the human leg may be calculated through an equation of $\theta_{id}=\theta_i-\theta_{i0}$.

Similarly, the expected rotational angular velocity $\dot{\theta}_{id}$ (i=1, 2, 3, ... 6) corresponding to each sub-joint of the legs of the human can be obtained.

Figure 6:
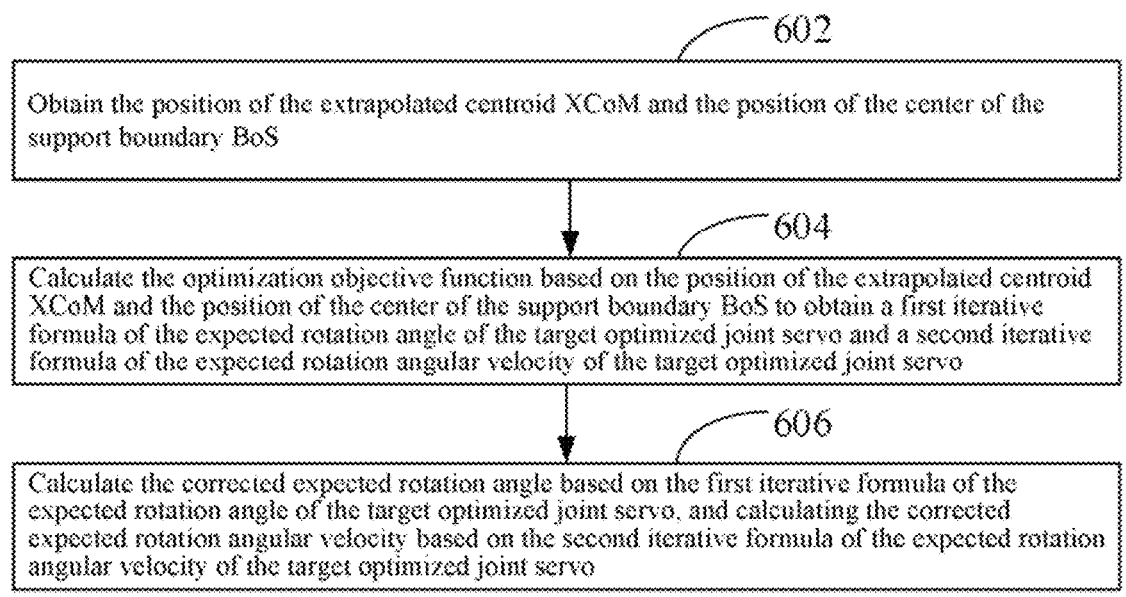
FIG. 6 is a flow chart of an example of optimization in the humanoid robot control method of FIG. 1.

FIG. 6 is a flow chart of an example of optimization in the humanoid robot control method of FIG. 1. As shown in FIG. 6, in one embodiment, the step 108 of optimizing the second expected rotation angle and the second expected rotation angular velocity of the target optimized joint servos based on the optimization objective function to obtain a corrected expected rotation angle and a corrected expected rotation angular velocity of the target optimized joint servos may include the following steps.

602: obtaining the position of the extrapolated centroid XCoM and the position of the center of the BoS.

604: calculating the optimization objective function based on the position of the extrapolated centroid XCoM and the position of the center of the BoS to obtain a first iterative formula of the expected rotation angle of the target optimized joint servo and a second iterative formula of the expected rotation angular velocity of the target optimized joint servo.

In one embodiment, the partial derivative of the expected rotation angle $\theta_2$ of the target optimized joint servo and the expected rotation angular velocity $\dot{\theta}_2$ of the target optimized joint servo may be calculated through equations of:

$$\frac{\partial \mathcal{J}(\theta_2, \dot{\theta}_2)}{\partial \theta_2} = (b_x - s_x)\frac{\partial b_x}{\partial \theta_2} + (b_y - s_y)\frac{\partial b_y}{\partial \theta_2}; \text{ and}$$

-continued $$\frac{\partial \mathcal{J}(\theta_2, \dot{\theta}_2)}{\partial \dot{\theta}_2} = (b_x - s_x)\frac{\partial b_x}{\partial \dot{\theta}_2} + (b_y - s_y)\frac{\partial b_y}{\partial \dot{\theta}_2}$$

The iterative formula to obtain the expected rotation angle of the target optimized joint servo is as an equation of:

$$\theta_2 \leftarrow \theta_2 - \alpha_1 \frac{\partial \mathcal{J}(\theta_2, \dot{\theta}_2)}{\partial \theta_2}$$

The iterative formula for the expected rotation angular velocity of the target optimized joint servo is as an equation of:

$$\dot{\theta}_2 \leftarrow \dot{\theta}_2 - \alpha_2 \frac{\partial \mathcal{J}(\theta_2, \dot{\theta}_2)}{\partial \dot{\theta}_2};$$

where, the symbol "←" represents the iterative process, and $\alpha_1$ and $\alpha_2$ are the iteration step sizes.

606: calculating the corrected expected rotation angle based on the first iterative formula of the expected rotation angle of the target optimized joint servo, and calculating the corrected expected rotation angular velocity based on the second iterative formula of the expected rotation angular velocity of the target optimized joint servo.

In one embodiment, the convergence condition of the optimal expected rotation angle $\theta_2$ and expected rotation angular velocity $\dot{\theta}_2$ which are obtained by searching through an optimization algorithm is that the extrapolated centroid XCoM is within half of the boundary of the BoS or reaches the maximum number of iterations. In which, the optimization algorithm may be a heuristic algorithm such as genetic algorithm and ant colony algorithm, or a traditional optimization algorithm such as Newton's method and gradient descent method.

In one embodiment, the optimizing the second expected rotation angle and the second expected rotation angular velocity of the target optimized joint servos based on the optimization objective function to obtain a corrected expected rotation angle and a corrected expected rotation angular velocity of the target optimized joint servos further includes: determining whether the extrapolated centroid XCoM is within half of the boundary of the BoS; and if so, the corrected expected rotation angle and the corrected expected rotation angular velocity are output; otherwise, step 604 is re-performed. In another embodiment, the above-mentioned may further include: determining whether an iteration formula of the expected rotation angle of the target optimized joint servo and an iteration formula of the expected rotation angular velocity of the target optimized joint servo reach the maximum number of iterations; and if so, the corrected expected rotation angle and the corrected expected rotation angular velocity are output; otherwise, step 604 is re-performed.

Figure 7:
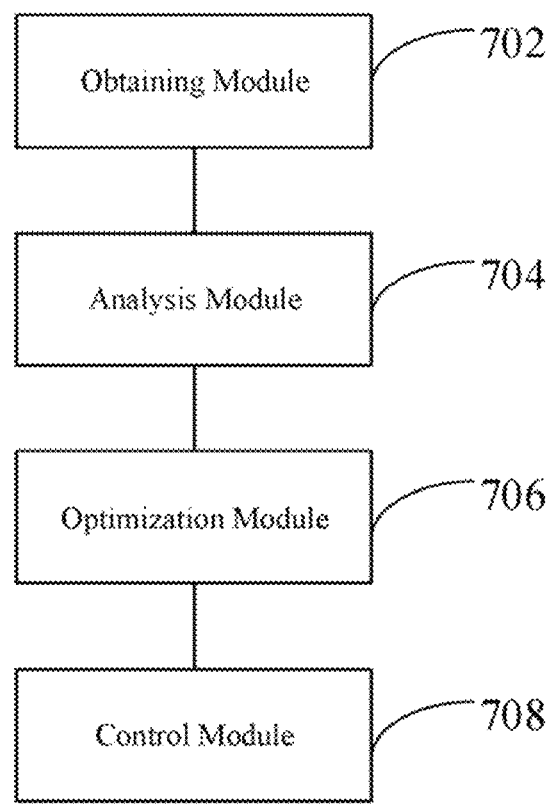
FIG. 7 is a schematic block diagram of a humanoid robot control apparatus according to an embodiment of the present disclosure.

FIG. 7 is a schematic block diagram of a humanoid robot control apparatus according to an embodiment of the present disclosure. In this embodiment, a humanoid robot control apparatus is provided, which may be applied to a humanoid robot shown in FIG. 8. As shown in FIG. 7, the humanoid robot control apparatus may include:

an obtaining module 702 configured to collect posture information of leg joints of a human body through posture sensors disposed on the human body;

an analysis module 704 configured to map posture information of the leg joints of the human body to leg joint servos of the humanoid robot to obtain a first expected rotation angle and a first expected rotation angular velocity of one or more non-target optimized joint servos of the leg joint servos and a second expected rotation angle and a second expected rotation angular velocity of one or more target optimized joint servos of the leg joint servos;

an optimization module 706 configured to obtain an optimization objective function corresponding to the one or more target optimized joint servos of the leg joint servos, and to optimize the second expected rotation angle and the second expected rotation angular velocity of the one or more target optimized joint servos based on the optimization objective function to obtain a corrected expected rotation angle and a corrected expected rotation angular velocity of the one or more target optimized joint servos; and a control module 708 configured to control each of the leg joint servos of the humanoid robot based on the first expected rotation angle and the first expected rotation angular velocity of the one or more non-target optimized joint servos and the corrected expected rotation angle and the corrected expected rotation angular velocity of the one or more target optimized joint servos.

Figure 8:
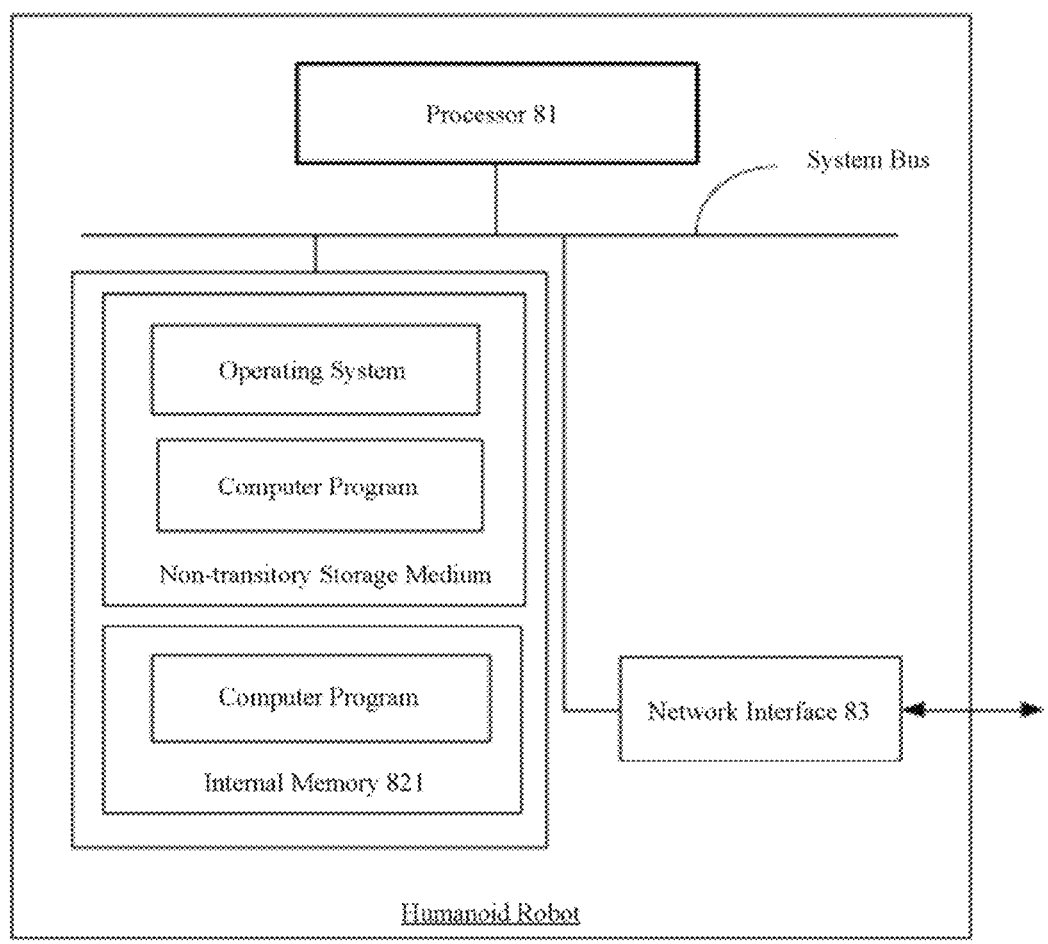
FIG. 8 is a schematic block diagram of a humanoid robot according to an embodiment of the present disclosure.
Figure 9:
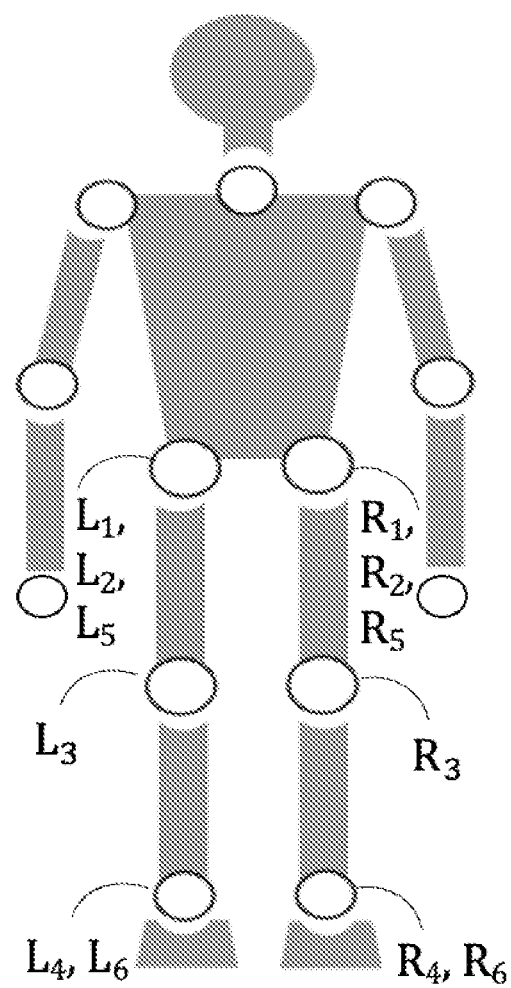
FIG. 9 is a schematic diagram of a humanoid robot and joint servos of the humanoid robot according to an embodiment of the present disclosure.

FIG. 8 is a schematic block diagram of a humanoid robot according to an embodiment of the present disclosure. In this embodiment, a humanoid robot is provided. The humanoid robot may be a humanoid robot, or a terminal or server connected to the humanoid robot. As shown in FIG. 8, the robot includes a processor 81, a storage, and a network interface 83 and a camera which are connected through a system bus. In which, the storage includes a non-volatile storage medium and an internal memory 821. The non-volatile storage medium of the robot stores an operating system, and may also store a computer program which enables the processor 81 to implement the humanoid robot control method for robot sensors when executed by the processor 81. The internal memory 821 may also store a computer program which enables the processor 81 to perform the humanoid robot control method for robot sensors when executed by the processor 81. The network interface is used to communicate with the exterior. It can be understood by those skilled in the art that, the structure shown in FIG. 8 is only a block diagram of a part of the structure related to the scheme of the present disclosure, and does not constitute a limitation of the robot to which the scheme of the present disclosure is applied. The specific robot may include more or fewer components than shown in the figures, or some components can be combined, or can have different component arrangements.

In one embodiment, the provided humanoid robot includes the processor 81, the storage coupled to the processor 81, and computer program(s) stored in the memory and executable on the processor. In which, the computer program(s) include instructions for performing the steps of the above-mentioned humanoid robot control method.

In one embodiment, a non-transitory computer readable storage medium stored with computer program(s) is provided. When the computer program(s) are executed by processor(s), the processor(s) causes the processor(s) to execute the steps of the above-mentioned humanoid robot control method.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. it should be noted that, for those skilled in the art, a number of variations and improvements can still be made without departing from the spirit and scope of the present disclosure. Therefore, the scope of the present disclosure should be determined by the appended claims.

What is claimed is:

1. A computer-implemented control method for a humanoid robot, comprising:

collecting posture information of leg joints of a human body;

mapping the posture information of the leg joints of the human body to leg joint servos of the humanoid robot to obtain a first expected rotation angle and a first expected rotation angular velocity of one or more first joint servos of the leg joint servos and a second expected rotation angle and a second expected rotation angular velocity of one or more second joint servos of the leg joint servos;

obtaining an optimization objective function corresponding to the one or more second joint servos of the leg joint servos;

optimizing the second expected rotation angle and the second expected rotation angular velocity of the one or more second joint servos based on the optimization objective function to obtain a corrected expected rotation angle and a corrected expected rotation angular velocity of the one or more second joint servos;

obtaining a first actual rotation angle of the one or more first joint servos and a second actual rotation angle of the one or more second joint servos;

calculating a first reference velocity of the one or more first joint servos based on the first actual rotation angle, the first expected rotation angle and the first expected rotation angular velocity of the one or more first joint servos;

calculating a second reference velocity of the one or more second joint servos based on the second actual rotation angle, the corrected rotation angle and the corrected rotation angular velocity of the one or more second joint servos; and controlling each of the leg joint servos of the humanoid robot based on the first reference velocity of the one or more first joint servos and the second reference velocity of the one or more second joint servos.

2. The method of claim 1, wherein the first joint servo comprises a hip rotational joint servo, a front hip joint servo, a front knee joint servo, and a front ankle joint servo.

3. The method of claim 1, wherein the leg joints of the human body comprise six leg sub-joints, and the six leg sub-joints are a left hip joint, a left knee joint, a left ankle joint, a right hip joint, a right knee joint, and a right ankle joint;

the mapping the posture information of the leg joints of the human body to leg joint servos of the humanoid robot to obtain the first expected rotation angle and the first expected rotation angular velocity of the one or more first joint servos of the leg joint servos and the second expected rotation angle and the second expected rotation angular velocity of the one or more second joint servos of the leg joint servos comprises:

obtaining a first posture sampling node and a second posture sampling node associated with each of the leg sub-joints, wherein both the first posture sampling node and the second posture sampling node include a posture sensor;

obtaining first posture information collected via the first posture sampling node, and obtaining second posture information collected via the second posture sampling node;

calculating a pose relationship of the second pose sampling node relative to the first pose sampling node based on the first posture information and the second posture information;

calculating a current rotation angle of each of the leg sub joints based on the pose relationship corresponding to the leg sub-joint; and determining the expected rotation angle and the expected rotation angular velocity corresponding to each of the leg joint servos of the humanoid robot based on the current rotation angle of each of the leg sub-joints.

4. The method of claim 3, wherein the determining the expected rotation angle and the expected rotation angular velocity corresponding to each of the leg joint servos of the humanoid robot based on the current rotation angle of each of the leg sub joints comprises:

determining the expected rotation angle and the expected rotation angular velocity corresponding to a left hip rotational joint servo, a left hip front joint servo, and a left hip side joint servo in the leg joint servos of the humanoid robot based on the current rotation angle of the left hip joint;

determining the expected rotation angle and the expected rotation angular velocity corresponding to a left knee front joint servo in the leg joint servos of the humanoid robot based on the current rotation angle of the left knee joint;

determining the expected rotation angle and the expected rotation angular velocity corresponding to a left ankle front joint servo and a left ankle side joint servo in the leg joint servos of the humanoid robot based on the current rotation angle of the left ankle joint;

determining the expected rotation angle and the expected rotation angular velocity corresponding to a right hip rotational joint servo, a right hip front joint servo, and a right hip side joint servo in the leg joint servos of the humanoid robot based on the current rotation angle of the right hip joint;

determining the expected rotation angle and the expected rotation angular velocity corresponding to a right knee front joint servo in the leg joint servos of the humanoid robot based on the current rotation angle of the right knee joint; and determining the expected rotation angle and the expected rotation angular velocity corresponding to a right ankle front joint servo and a right ankle side joint servo in the leg joint servos of the humanoid robot based on the current rotation angle of the right ankle joint.

5. The method of claim 3, wherein after the calculating the current rotation angle of each of the leg sub joints based on the pose relationship corresponding to the leg sub-joint, the method further comprises:

obtaining an initial rotation angle of each of the leg sub-joints;

the determining the expected rotation angle and the expected rotation angular velocity corresponding to each of the leg joint servos of the humanoid robot based on the current rotation angle of each of the leg sub joints comprises:

determining the expected rotation angle and the expected rotation angular velocity corresponding to each of the leg joint servos of the humanoid robot based on the initial rotation angle and the current rotation angle of each of the leg sub-joints.

6. The method of claim 1, wherein the optimization objective function is created based on a stability theory of an extrapolated centroid (XCoM) through an equation of:

$$\mathcal{J}(\theta_2, \hat{\theta}_2) = \frac{1}{2}\|b - s\|^2;$$

where, $b=(b_x, b_y)$ is a position of the XCoM, $s=(s_x, s_y)$ is a position of the center of a boundary of support (BoS), $\theta_2$ is the corrected expected rotation angle of the second joint servo, and $\hat{\theta}_2$, is the corrected expected angular velocity of the second joint servo.

7. The method of claim 6, wherein the optimizing the second expected rotation angle and the second expected rotation angular velocity of the one or more second joint servos based on the optimization objective function to obtain the corrected expected rotation angle and the corrected expected rotation angular velocity of the one or more second joint servos comprises:

obtaining the position of the XCoM and the position of the center of the BoS;

calculating the optimization objective function based on the position of the XCoM and the position of the center of the BoS to obtain a first iterative formula of the expected rotation angle of the second joint servo and a second iterative formula of the expected rotation angular velocity of the second joint servo; and calculating the corrected expected rotation angle based on the first iterative formula of the expected rotation angle of the second joint servo, and calculating the corrected expected rotation angular velocity based on the second iterative formula of the expected rotation angular velocity of the second joint servo.

8. A humanoid robot, comprising:
a processor;
a memory coupled to the processor; and
one or more computer programs stored in the memory and executable on the processor;
wherein, the one or more computer programs comprise:
instructions for collecting posture information of leg joints of a human body;
instructions for mapping the posture information of the leg joints of the human body to leg joint servos of the humanoid robot to obtain a first expected rotation angle and a first expected rotation angular velocity of one or more first joint servos of the leg joint servos and a second expected rotation angle and a second expected rotation angular velocity of one or more second joint servos of the leg joint servos;
instructions for obtaining an optimization objective function corresponding to the one or more second joint servos of the leg joint servos;
instructions for optimizing the second expected rotation angle and the second expected rotation angular velocity of the one or more second joint servos based on the optimization objective function to obtain a corrected expected rotation angle and a corrected expected rotation angular velocity of the one or more second joint servos;
instructions for obtaining a first actual rotation angle of the one or more first joint servos and a second actual rotation angle of the one or more second joint servos;
instructions for calculating a first reference velocity of the one or more first joint servos based on the first actual rotation angle, the first expected rotation angle and the first expected rotation angular velocity of the one or more first joint servos;
instructions for calculating a second reference velocity of the one or more second joint servos based on the second actual rotation angle, the corrected rotation angle and the corrected rotation angular velocity of the one or more second joint servos; and
instructions for controlling each of the leg joint servos of the humanoid robot based on the first reference velocity of the one or more first joint servos and the second reference velocity of the one or more second joint servos.

9. The humanoid robot of claim 8, wherein the first joint servo comprises a hip rotational joint servo, a front hip joint servo, a front knee joint servo, and a front ankle joint servo.

10. The humanoid robot of claim 8, wherein the leg joints of the human body comprise six leg sub-joints, and the six leg sub joints are a left hip joint, a left knee joint, a left ankle joint, a right hip joint, a right knee joint, and a right ankle joint;
the instructions for mapping the posture information of the leg joints of the human body to leg joint servos of the humanoid robot to obtain the first expected rotation angle and the first expected rotation angular velocity of the one or more first joint servos of the leg joint servos and the second expected rotation angle and the second expected rotation angular velocity of the one or more second joint servos of the leg joint servos comprise:
instructions for obtaining a first posture sampling node and a second posture sampling node associated with each of the leg sub-joints;
instructions for obtaining first posture information collected via the first posture sampling node, and obtaining second posture information collected via the second posture sampling node;
instructions for calculating a pose relationship of the second pose sampling node relative to the first pose sampling node based on the first posture information and the second posture information;
instructions for calculating a current rotation angle of each of the leg sub joints based on the pose relationship corresponding to the leg sub-joint; and
instructions for determining the expected rotation angle and the expected rotation angular velocity corresponding to each of the leg joint servos of the humanoid robot based on the current rotation angle of each of the leg sub joints.

11. The humanoid robot of claim 10, wherein the instructions for determining the expected rotation angle and the expected rotation angular velocity corresponding to each of the leg joint servos of the humanoid robot based on the current rotation angle of each of the leg sub joints comprise:
instructions for determining the expected rotation angle and the expected rotation angular velocity corresponding to a left hip rotational joint servo, a left hip front joint servo, and a left hip side joint servo in the leg joint servos of the humanoid robot based on the current rotation angle of the left hip joint;
instructions for determining the expected rotation angle and the expected rotation angular velocity corresponding to a left knee front joint servo in the leg joint servos of the humanoid robot based on the current rotation angle of the left knee joint;
instructions for determining the expected rotation angle and the expected rotation angular velocity corresponding to a left ankle front joint servo and a left ankle side joint servo in the leg joint servos of the humanoid robot based on the current rotation angle of the left ankle joint;
instructions for determining the expected rotation angle and the expected rotation angular velocity corresponding to a right hip rotational joint servo, a right hip front joint servo, and a right hip side joint servo in the leg joint servos of the humanoid robot based on the current rotation angle of the right hip joint;
instructions for determining the expected rotation angle and the expected rotation angular velocity corresponding to a right knee front joint servo in the leg joint servos of the humanoid robot based on the current rotation angle of the right knee joint; and
instructions for determining the expected rotation angle and the expected rotation angular velocity corresponding to a right ankle front joint servo and a right ankle side joint servo in the leg joint servos of the humanoid robot based on the current rotation angle of the right ankle joint.

12. The humanoid robot of claim 10, wherein the one or more computer programs further comprise:
instructions for obtaining an initial rotation angle of each of the leg sub-joints;
the instructions for determining the expected rotation angle and the expected rotation angular velocity corresponding to each of the leg joint servos of leg of the humanoid robot based on the current rotation angle of each of the leg sub joints comprise:
instructions for determining the expected rotation angle and the expected rotation angular velocity corresponding to each of the leg joint servos of the humanoid robot based on the initial rotation angle and the current rotation angle of each of the leg sub-joints.

13. The humanoid robot of claim 8, wherein the optimization objective function is created based on a stability theory of an extrapolated centroid (XCoM) through an equation of:

$$\mathcal{J}(\theta_2, \hat{\theta}_2) = \frac{1}{2}\|b-s\|^2;$$

where, $b=(b_x, b_y)$ is a position of the XCoM, $s=(s_x, s_y)$ is a position of a center of a boundary of support (BoS), $\theta_2$ is the corrected expected rotation angle of the second joint servo, and $\hat{\theta}_2$ is the corrected expected angular velocity of the second joint servo.

14. The humanoid robot of claim 13, wherein the instructions for optimizing the second expected rotation angle and the second expected rotation angular velocity of the one or more second joint servos based on the optimization objective function to obtain the corrected expected rotation angle and the corrected expected rotation angular velocity of the one or more second joint servos comprise:
   instructions for obtaining the position of the XCoM and the position of the center of the BoS;
   instructions for calculating the optimization objective function based on the position of the XCoM and the position of the center of the BoS to obtain a first iterative formula of the expected rotation angle of the second joint servo and a second iterative formula of the expected rotation angular velocity of the second joint servo; and
   instructions for calculating the corrected expected rotation angle based on the first iterative formula of the expected rotation angle of the second joint servo, and calculating the corrected expected rotation angular velocity based on the second iterative formula of the expected rotation angular velocity of the second joint servo.

15. A non-transitory computer readable storage medium for storing one or more computer programs, wherein the one or more computer programs comprise:
   instructions for collecting posture information of leg joints of a human body ;
   instructions for mapping the posture information of the leg joints of the human body to leg joint servos of the humanoid robot to obtain a first expected rotation angle and a first expected rotation angular velocity of one or more first joint servos of the leg joint servos and a second expected rotation angle and a second expected rotation angular velocity of one or more second joint servos of the leg joint servos;
   instructions for obtaining an optimization objective function corresponding to the one or more second joint servos of the leg joint servos;
   instructions for optimizing the second expected rotation angle and the second expected rotation angular velocity of the one or more second joint servos based on the optimization objective function to obtain a corrected expected rotation angle and a corrected expected rotation angular velocity of the one or more second joint servos;
   instructions for obtaining a first actual rotation angle of the one or more first joint servos and a second actual rotation angle of the one or more second joint servos;
   instructions for calculating a first reference velocity of the one or more first joint servos based on the first actual rotation angle, the first expected rotation angle and the first expected rotation angular velocity of the one or more first joint servos;
   instructions for calculating a second reference velocity of the one or more second joint servos based on the second actual rotation angle, the corrected rotation angle and the corrected rotation angular velocity of the one or more second joint servos; and
   instructions for controlling each of the leg joint servos of the humanoid robot based on the first reference velocity of the one or more first joint servos and the second reference velocity of the one or more second joint servos.

16. The storage medium of claim 15, wherein the first joint servo comprises a hip rotational joint servo, a front hip joint servo, a front knee joint servo, and a front ankle joint servo.

17. The storage medium of claim 15, wherein the leg joints of the human body comprise six leg sub-joints, and the six leg sub joints are a left hip joint, a left knee joint, a left ankle joint, a right hip joint, a right knee joint, and a right ankle joint;
   the instructions for mapping the posture information of the leg joints of the human body to leg joint servos of the humanoid robot to obtain the first expected rotation angle and the first expected rotation angular velocity of the one or more first joint servos of the leg joint servos and the second expected rotation angle and the second expected rotation angular velocity of the one or more second joint servos of the leg joint servos comprise:
   instructions for obtaining a first posture sampling node and a second posture sampling node associated with each of the leg sub-joints;
   instructions for obtaining first posture information collected via the first posture sampling node, and obtaining second posture information collected via the second posture sampling node;
   instructions for calculating a pose relationship of the second pose sampling node relative to the first pose sampling node based on the first posture information and the second posture information;
   instructions for calculating a current rotation angle of each of the leg sub joints based on the pose relationship corresponding to the leg sub-joint; and
   instructions for determining the expected rotation angle and the expected rotation angular velocity corresponding to each of the leg joint servos of the humanoid robot based on the current rotation angle of each of the leg sub joints.

* * * * *